(12) United States Patent
Uno et al.

(10) Patent No.: US 9,209,697 B2
(45) Date of Patent: Dec. 8, 2015

(54) SWITCHING POWER-SUPPLY DEVICE

(71) Applicant: Murata Manufacturing Co., Ltd., Nagaokakyo-shi, Kyoto-fu (JP)

(72) Inventors: Yoshiyuki Uno, Nagaokakyo (JP); Hajime Shiji, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 188 days.

(21) Appl. No.: 13/910,307

(22) Filed: Jun. 5, 2013

(65) Prior Publication Data

US 2013/0336017 A1    Dec. 19, 2013

(30) Foreign Application Priority Data

Jun. 14, 2012   (JP) .................. 2012-134345

(51) Int. Cl.
*H02M 3/335*   (2006.01)
*H02M 1/42*    (2007.01)
*H02M 3/337*   (2006.01)
*H02M 1/00*    (2007.01)

(52) U.S. Cl.
CPC ........ *H02M 3/33507* (2013.01); *H02M 1/4225* (2013.01); *H02M 3/3376* (2013.01); *H02M 2001/007* (2013.01); *Y02B 70/126* (2013.01); *Y02B 70/1433* (2013.01)

(58) Field of Classification Search
CPC .................. H02M 1/4225; H02M 2001/0009; H02M 2001/0058; Y02B 70/126

USPC ............. 363/16–20, 21.02–21.04, 79, 89, 98, 363/127; 323/222, 205, 207, 272, 282–288; 315/86, 112, 307, 291, 294
See application file for complete search history.

(56) References Cited

U.S. PATENT DOCUMENTS

| | | | | |
|---|---|---|---|---|
| 5,969,962 | A * | 10/1999 | Gabor ............................. | 363/89 |
| 7,336,057 | B2 * | 2/2008 | Hirabayashi .................. | 323/266 |
| 7,848,117 | B2 * | 12/2010 | Reinberger et al. ............. | 363/16 |
| 7,911,812 | B2 * | 3/2011 | Colbeck et al. ............ | 363/21.02 |
| 7,977,926 | B2 * | 7/2011 | Williams ...................... | 323/223 |
| 8,269,141 | B2 * | 9/2012 | Daniel et al. ................ | 219/130.1 |
| 8,300,429 | B2 * | 10/2012 | Orr et al. ..................... | 363/21.02 |
| 8,330,389 | B2 * | 12/2012 | Adragna ....................... | 315/294 |
| 2010/0164400 | A1 * | 7/2010 | Adragna ....................... | 315/294 |

FOREIGN PATENT DOCUMENTS

| | | |
|---|---|---|
| JP | 58-114212 A | 7/1983 |
| JP | 64-43062 A | 2/1989 |
| JP | 06-30557 A | 2/1994 |
| JP | 2006-129145 A | 5/2006 |

* cited by examiner

*Primary Examiner* — Rajnikant Patel
(74) *Attorney, Agent, or Firm* — Keating & Bennett, LLP

(57) ABSTRACT

A resonant converter circuit generates an output voltage from an input voltage by switching first and second FETs. A subsequent-stage switching control circuit alternately subjects the first and second FETs in the resonant converter circuit to on/off control with a fixed on-duty ratio and a fixed switching frequency. A boost converter circuit includes an inductor, a smoothing capacitor, and a third FET arranged to switch the energization of the inductor. A previous-stage switching control circuit subjects the third FET in the boost converter circuit to on/off control with a controlled on-duty ratio, and adjusts an output voltage to the resonant converter circuit.

19 Claims, 8 Drawing Sheets

SWITCHING POWER-SUPPLY DEVICE

BACKGROUND OF THE INVENTION

1. Field of the Invention

The present invention relates to a switching power-supply device including a converter with a two-stage configuration.

2. Description of the Related Art

In Japanese Unexamined Patent Application Publication No. 64-43062, a DC-DC converter is disclosed that has a configuration in which a current-input-type converter is provided in a previous stage and a series resonant converter is provided in a subsequent stage. The current-input-type converter located at the previous stage detects an output voltage, and controls an input voltage to the series resonant converter located at the subsequent stage so as to have a given level. The series resonant converter located at the subsequent stage operates with a fixed frequency so that the input voltage becomes a load voltage that does not change.

In Japanese Unexamined Patent Application Publication No. 64-43062, the current-input-type converter located at the previous stage includes a capacitor in the output thereof. If the charging voltage of this capacitor is Vc and the input voltage thereof is Vs, a relationship with an input voltage Vi to the converter located at the subsequent stage becomes Vi=Vs− Vc. In Japanese Unexamined Patent Application Publication No. 64-43062, when an instantaneous power failure is taken into consideration, it may be necessary to make a voltage conversion ratio large, which is due to the current-input-type converter located at the previous stage.

For example, when the input voltage Vi of the converter located at the subsequent stage is about 200 V, the charging voltage Vc of the capacitor is reduced at the time of the instantaneous power failure, and thus, the DC-DC converter is operable until the input voltage Vs becomes reduced to about 200 V. On the other hand, when it is assumed that the input voltage Vs at the time of a steady state is about 380 V, it may be necessary for the current-input-type converter to perform a voltage conversion operation so that the charging voltage Vc of the capacitor becomes about 180 V. In this manner, in the DC-DC converter described in Japanese Unexamined Patent Application Publication No. 64-43062, when an input voltage range is large in view of the instantaneous power failure, a problem has occurred in which the voltage conversion ratio at the time of a steady state is large and inefficiency arises.

SUMMARY OF THE INVENTION

Preferred embodiments of the present invention provide a switching power-supply device in which even if an input voltage range is set so as to be large, highly efficient voltage conversion can be performed at the time of a steady state.

According to a preferred embodiment of the present invention, a switching power-supply device includes a non-insulated converter arranged to boost an input power supply voltage, which is input to the non-insulated converter, and output a direct-current voltage, and an insulated bridge converter into which the direct-current voltage output from the non-insulated converter is input and that is arranged to output a direct-current voltage to a load, wherein the insulated bridge converter includes a transformer arranged to include a primary winding and a secondary winding, an alternating-current voltage generation circuit arranged to be connected to the primary winding, include a first switch element and a second switch element, and generate and apply to the primary winding an alternating-current voltage from the input direct-current voltage due to switching of the first switch element and the second switch element, and a rectifier circuit arranged to be connected to the secondary winding and rectify and output to the load a voltage induced in the secondary winding due to magnetic field coupling with the primary winding, the non-insulated converter includes an inductor, a capacitor, and a third switch element arranged to switch energization of the inductor, and the switching power-supply device further includes a switching control circuit arranged to alternately subject the first switch element and the second switch element to on/off control with a dead time sandwiched therebetween, using a fixed on-duty ratio and a fixed switching frequency, and a PWM control circuit arranged to subject the third switch element to on/off control, control an on-duty ratio of the third switch element, and adjust an output voltage to the insulated bridge converter.

With this configuration, since the on-duty ratio of the non-insulated converter located at a previous stage is controlled, and the output voltage is adjusted, it is possible to perform the switching control of the first switch element and the second switch element with the fixed on-duty ratio and the fixed switching frequency. For example, by alternately subjecting the first switch element and the second switch element to on/off control with an on-duty ratio of about 50%, it is possible to cause the first switch element and the second switch element to operate with high efficiency, and it is possible to efficiently perform electric power conversion. In addition, by fixing the switching frequency of the first switch element and the second switch element, it is possible to set an optimum switching frequency. In addition, even if the input voltage fluctuates widely, it is possible to deal with the fluctuations by controlling the on-duty ratio of the non-insulated converter.

A configuration is preferable in which when the input power supply voltage is a threshold value or more, the PWM control circuit stops switching control of the third switch element, and the switching control circuit controls an on-duty ratio and/or a switching frequency of the first switch element and the second switch element.

With this configuration, when the input voltage is equal to the threshold value or more, the input voltage is input to the insulated bridge converter at a subsequent stage without change while the non-insulated converter is not caused to operate. Therefore, it is also possible to deal with a case in which the input voltage increases as compared to the time of a steady state.

A configuration may also be used in which the insulated bridge converter is a resonant converter.

With this configuration, since a substantially sine wave-shaped current flows, it is possible to reduce a switching loss caused by zero voltage switching or zero current switching.

A configuration is preferable in which the alternating-current voltage generation circuit includes a series resonant circuit arranged to include a capacitor and an inductor used for resonance, and an exciting inductance arranged in parallel to the primary winding, and the switching control circuit subjects the first switch element and the second switch element to on/off control with a switching frequency corresponding to a resonant frequency of the series resonant circuit.

With this configuration, the insulated bridge converter located at the subsequent stage is preferably an LLC circuit, and the first switch element and the second switch element are preferably controlled while the switching frequency is caused to correspond to the resonant frequency of the LLC circuit where no exciting inductance is taken into consideration. Accordingly, it is possible to prevent the frequency characteristic of the input-output voltage ratio (gain) of the insulated bridge converter when the winding ratio of the transformer is not taken into consideration from fluctuating as a result of the load.

A configuration is preferable in which the switching control circuit sets the fixed on-duty ratio to about 50%, and subjects the first switch element and the second switch element to on/off control.

With this configuration, since the on-duty ratio is about 50%, highly efficient voltage conversion can be provided.

The insulated bridge converter may preferably be a full-bridge converter, for example.

With this configuration, since the current ripple of a smoothing capacitor on a secondary side is small, the switching power-supply device is suitable for use in a low-voltage and large-current output.

The insulated bridge converter may also preferably be a half-bridge converter, for example.

With this configuration, it is possible to reduce the number of switching elements as compared to the full-bridge converter.

According to various preferred embodiments of the present invention, a converter is provided that has a two-stage configuration, a converter located at a previous stage is subjected to switching control, and thus, it is possible to control the fluctuation of an input voltage to a converter located at a subsequent stage. Therefore, even if an input voltage range is set so as to be large, highly efficient voltage conversion is provided at the time of a steady state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
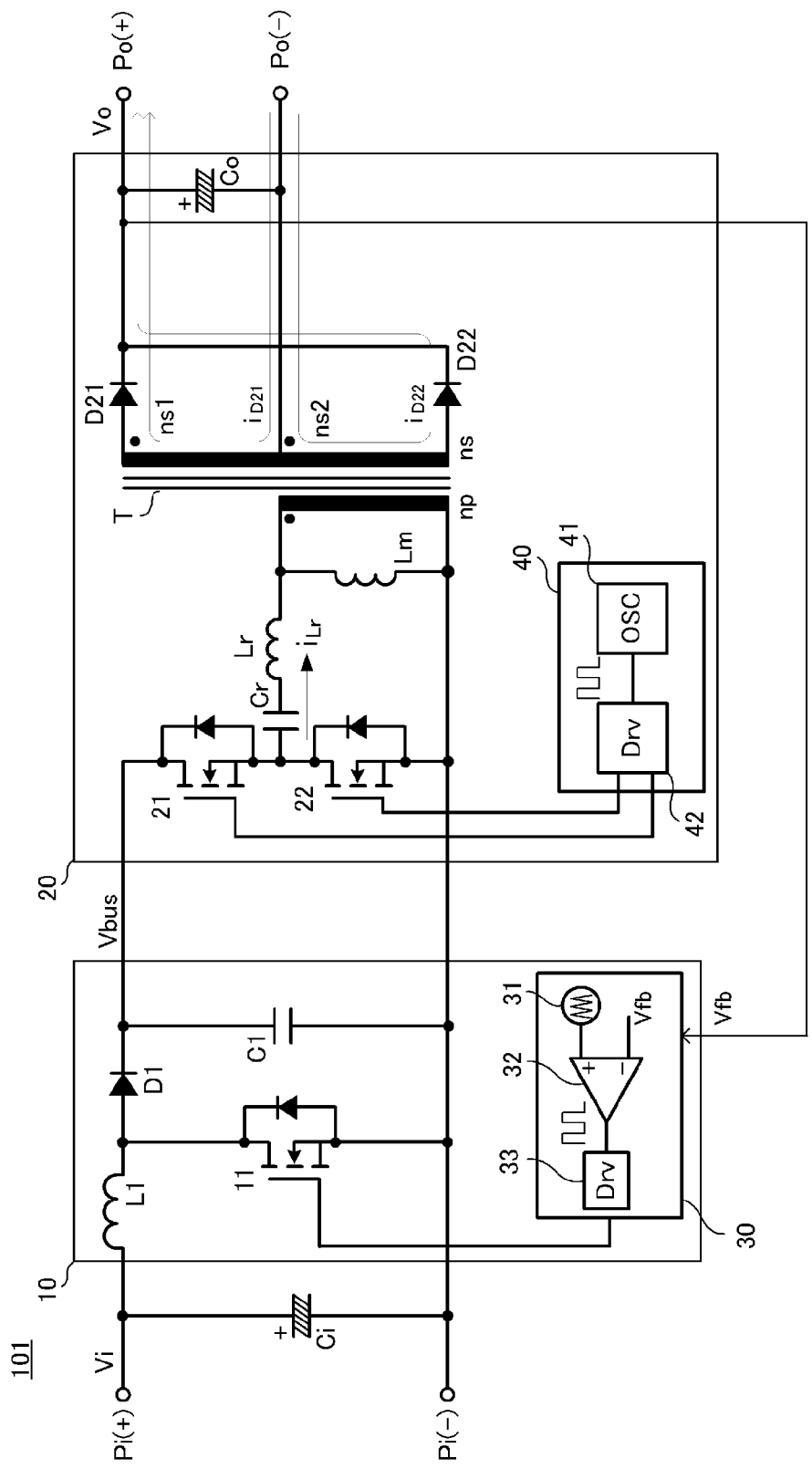
FIG. 1 is a circuit diagram of a switching power-supply device according to a first preferred embodiment of the present invention.

FIG. 1 is the circuit diagram of a switching power-supply device according to a first preferred embodiment of the present invention. Between input terminals Pi(+) and Pi(−) and output terminals Po(+) and Po(−), a switching power-supply device 101 includes a non-insulated converter in a previous stage and an insulated bridge converter in a subsequent stage. In the present preferred embodiment, the non-insulated converter is preferably a boost converter circuit 10, and the insulated bridge converter is preferably a half-bridge LLC resonant converter circuit (hereinafter, referred to as a resonant converter circuit) 20. A direct-current input voltage Vi is input from the input terminals Pi(+) and Pi(−), and an output voltage Vo is output from the output terminals Po(+) and Po(−). A load (not illustrated) is connected to the output terminals Po(+) and Po(−), and the output voltage Vo is supplied to this load.

The boost converter circuit 10 is connected to the input terminals Pi(+) and Pi(−), inputs the input voltage Vi, and outputs an output voltage (hereinafter, referred to as a bus voltage) Vbus. A smoothing capacitor Ci is further connected to the input terminals Pi(+) and Pi(−). The boost converter circuit 10 includes an inductor L1, an n-type MOSFET (hereinafter, referred to as an FET) 11, a diode D1, and a smoothing capacitor C1. The first end of the inductor L1 is connected to the input portion of the boost converter circuit 10, and the second end thereof is connected to the output portion of the boost converter circuit 10 through the diode D1.

The anode terminal of the diode D1 is connected to the inductor L1, and the cathode terminal of the diode D1 is connected to the output portion of the boost converter circuit 10. The smoothing capacitor C1 is connected to the cathode terminal of the diode D1. The drain terminal of the FET (a third switch element in preferred embodiments of the present invention) 11 is connected to a connection point between the inductor L1 and the diode D1, and the source terminal thereof is connected to a ground line. In addition, the gate terminal of the FET 11 is connected to a previous-stage switching control circuit (hereinafter, referred to as a previous-stage SW control circuit) 30, and is subjected to on/off control by the previous-stage SW control circuit 30. This previous-stage SW control circuit 30 corresponds to a PWM control circuit in preferred embodiments of the present invention.

To the previous-stage SW control circuit 30, a feedback voltage Vfb is input that corresponds to the output voltage Vo detected on the secondary side of a transformer T. In addition, in FIG. 1, only the path of feedback is simply expressed as one line. For example, feedback may be performed using an insulating mechanism, such as a photo coupler or a pulse transformer, for example. Specifically, a feedback circuit is connected between the output terminals Po(+)-Po(−), and the feedback circuit generates a feedback signal by comparing the voltage-dividing value of a voltage between the output terminals Po(+)-Po(−) with a reference voltage, and inputs the feedback voltage Vfb to the previous-stage SW control circuit 30 in an insulated state.

The previous-stage SW control circuit 30 includes an oscillator 31, a comparator 32, and a driver (Drv) 33, and subjects the FET 11 to on/off control with an on-duty ratio decided on the basis of the feedback voltage Vfb. The oscillator 31 is connected to the non-inverting input terminal (+) of the comparator 32, and outputs a reference wave voltage (ramp wave voltage), which is triangular or substantially triangular, to the comparator 32.

The feedback voltage Vfb is input to the inverting input end (−) of the comparator 32. The comparator 32 compares the input wave voltage with the feedback voltage Vfb, and generates a PWM signal having a duty corresponding to a comparison result. In other words, the on-duty ratio of the FET 11 is set by the feedback voltage Vfb. In addition, as a result, the previous-stage SW control circuit 30 changes the on-duty ratio of the FET 11, and thus, the output voltage Vo is controlled. On the basis of the PWM signal from the comparator 32, the driver 33 performs on/off control on the FET 11. In this manner, the previous-stage SW control circuit 30 controls the on-duty ratio of the FET 11, and thus, the output voltage Vo of the switching power-supply device 101 is controlled.

The resonant converter circuit 20 is connected to the subsequent stage of the boost converter circuit 10, and includes the transformer T including a primary winding np and a secondary winding ns. The resonant converter circuit 20 includes an FET (a first switch element in preferred embodiments of the present invention) 21 and an FET (a second switch element in preferred embodiments of the present invention) 22, on the primary side of the transformer T. Each of the FETs 21 and 22 is preferably an n-type FET, for example. A circuit generated on the primary side of the transformer T corresponds to an alternating-current voltage generation circuit according to preferred embodiments of the present invention.

The drain terminal of the FET 21 is connected to the output portion of the boost converter circuit 10, and the source terminal thereof is connected to the first end of the primary winding np of the transformer T through a series resonant circuit including a capacitor Cr and an inductor Lr used for resonance. In FIG. 1, an inductor Lm connected in parallel to the primary winding np is an exciting inductance occurring in the transformer T.

The drain terminal of the FET 22 is connected to the first end of the primary winding np of the transformer T through the series resonant circuit including the capacitor Cr and the inductor Lr used for resonance, and the source terminal thereof is connected to the second end of the primary winding np.

In addition, the resonant inductor Lr may also be the leakage inductance of the transformer T and may also be an external component.

The gate terminal of each of the FETs 21 and 22 is connected to a subsequent-stage switching control circuit (hereinafter, referred to as a subsequent-stage SW control circuit) 40, and the FETs 21 and 22 are subjected to on/off control by the subsequent-stage SW control circuit 40. The subsequent-stage SW control circuit 40 corresponds to a switching control circuit in preferred embodiments of the present invention. In detail, the FETs 21 and 22 are alternately turned on with the duty ratio preferably of about 50%, for example, and a dead time sandwiched therebetween and with the resonant frequency of the series resonant circuit as a switching frequency. The previous-stage SW control circuit 30 controls the on-duty ratio of the FET 11, and thus, the output voltage Vo of the switching power-supply device 101 is controlled. Therefore, it is possible to arbitrarily set the on-duty ratio and the switching frequency of the FETs 21 and 22 within a desired design range.

The resonant converter circuit 20 that functions as an LLC resonant circuit has a first resonant frequency f1 and a second resonant frequency f2. The first resonant frequency f1 is a frequency that is determined by the inductor Lr and the capacitor Cr used for resonance, and becomes $1/(2\pi\sqrt{(Lr \cdot Cr)})$. In addition, the second resonant frequency f2 is a frequency that is determined by the inductor Lr and the capacitor Cr used for resonance and the exciting inductance Lm and becomes $1/(2\pi\sqrt{(Lr+Lm)Cr})$. The subsequent-stage SW control circuit 40 causes the switching frequency fs of the FETs 21 and 22 to correspond to the first resonant frequency f1, and controls the FETs 21 and 22.

The resonant converter circuit 20, on the secondary side of the transformer T, includes diodes D21 and D22 and a smoothing capacitor Co. The diodes D21 and D22 and the smoothing capacitor Co define a rectifier circuit in preferred embodiments of the present invention. The first end of the secondary winding ns of the transformer T is connected to the anode terminal of the diode D21, and the second end thereof is connected to the anode terminal of the diode D22. The cathode terminal of each of the diodes D21 and D22 is connected to the output terminal Po(+). The smoothing capacitor Co is connected to the output terminals Po(+) and Po(−).

In addition, the secondary winding ns of the transformer T includes an intermediate tap, and the intermediate tap is connected to the output terminal Po(−). Hereinafter, for convenience of explanation, the secondary winding ns between the first end and the intermediate tap is referred to as a first secondary winding ns1, and the secondary winding ns between the second end and the intermediate tap is referred to as a second secondary winding ns2. The secondary side of the transformer T defines a full-wave rectifier circuit based on a center-tap method.

Next, a current waveform will be described when the subsequent-stage SW control circuit 40 causes the switching frequency fs of the FETs 21 and 22 to correspond to the first resonant frequency f1 and subjects the FETs 21 and 22 to switching control.

Figure 2:
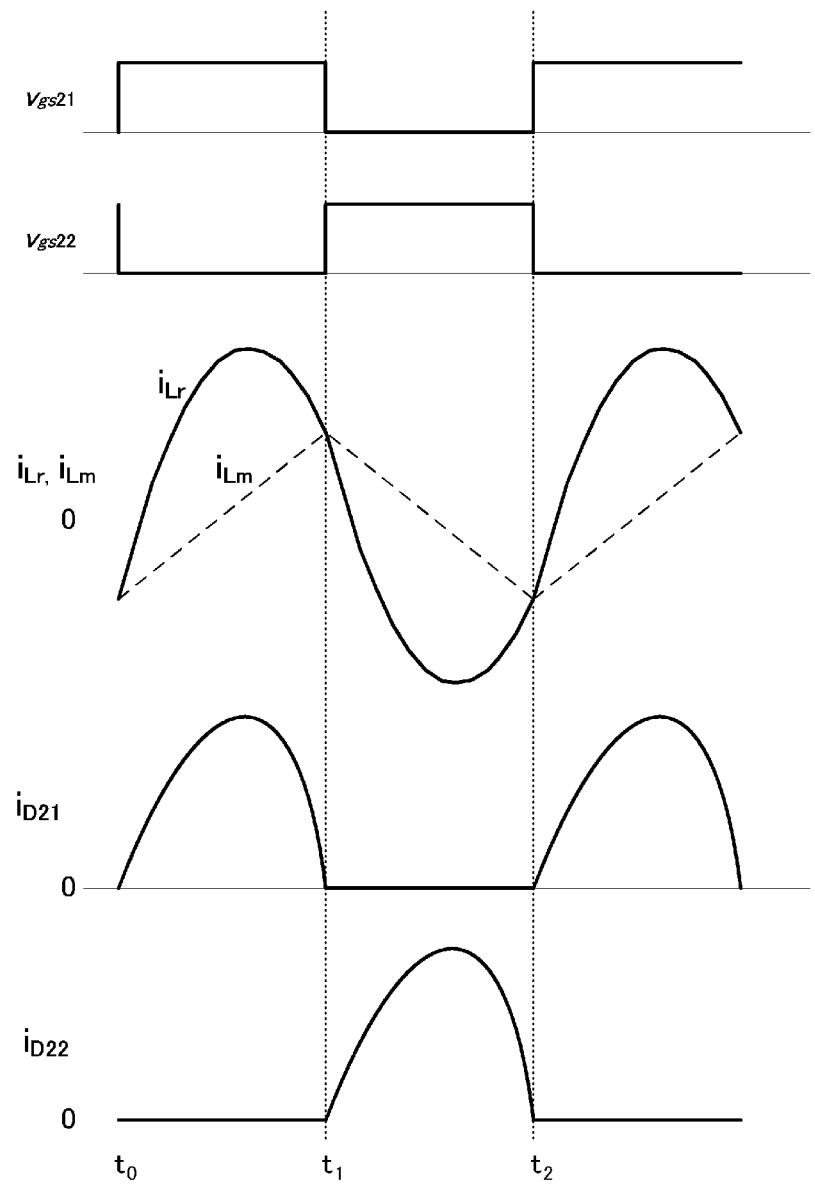
FIG. 2 is a waveform diagram according to control of the switching power-supply device according to the first preferred embodiment of the present invention.

FIG. 2 is a waveform diagram showing control of the switching power-supply device 101 according to the present preferred embodiment.

In FIG. 2, the horizontal axis is a time axis. Times $t_0$ and $t_2$ are timings when the FET 22 is turned off and the FET 21 is turned on. In addition, a time $t_1$ is a timing when the FET 21 is turned off and the FET 22 is turned on. While being omitted in FIG. 2, a short dead time is provided between the turn-off and the turn-on.

In addition, FIG. 2 individually illustrates the waveforms of gate voltages Vgs21 and Vgs22 applied to the gate terminals of the FETs 21 and 22, a resonant current $i_{Lr}$ flowing in the inductor Lr used for resonance, an exciting current $i_{Lm}$ flowing in the exciting inductance Lm, and currents $i_{D21}$ and $i_{D22}$ flowing in the secondary-side diodes D21 and D22 of the transformer T. In addition, for a current flowing on the primary side, it is assumed that the current has a positive value when flowing from the capacitor Cr used for resonance toward the primary winding np direction and the current has a negative value when flowing in an opposite direction.

During a time period $t_0$ to $t_1$, shortly after the FET 22 has been turned off, a current flows through a path, such as the exciting inductance Lm→the series resonant circuit (the inductor Lr and the capacitor Cr used for resonance)→the body diode of the FET 21. Accordingly, the resonant current $i_{Lr}$ becomes a negative value. After that, the FET 21 is turned on, a current flows through a path, such as the FET 21→the series resonant circuit→the exciting inductance Lm, and the resonant current $i_{Lr}$ is switched to a positive value. The waveform of the resonant current $i_{Lr}$ has a substantially sine wave shape, and the frequency thereof is the first resonant frequency f1. In addition, when the FET 21 is turned on, the drain voltage of the FET 21 is about zero. Therefore, the FET 21 becomes a zero voltage switch (ZVS).

In addition, during the time period $t_0$ to $t_1$, a difference current between the resonant current $i_{Lr}$ and the exciting current $i_{Lm}$ flows in the primary winding np of the transformer T, and due to magnetic field coupling, a voltage is induced in the secondary winding ns of the transformer T. In addition, on the secondary side of the transformer T, the current $i_{D21}$ flows in a path including the first secondary winding ns1 and the diode D21.

In addition, since a voltage applied to the exciting inductance Lm becomes a voltage that is proportional to the output voltage Vo and a turn ratio due to the magnetic field coupling of the transformer T, the exciting current $i_{Lm}$ increases approximately linearly.

During a time period $t_1$ to $t_2$, shortly after the FET 21 has been turned off, a current flows through a path, such as the body diode of FET 22→the series resonant circuit→the exciting inductance Lm. Accordingly, the resonant current $i_{Lr}$ becomes a positive value. After that, the FET 22 is turned on, a current flows through a path, such as the exciting inductance Lm→the series resonant circuit→the FET 22, and the resonant current $i_{Lr}$ is switched to a negative value. In addition, when the FET 22 is turned on, the drain voltage of the FET 22 is about zero. Therefore, the FET 22 becomes a ZVS. In the same manner, the exciting current $i_{Lm}$ flows in the exciting inductance Lm.

During a time period $t_1$ to $t_2$, a difference current between the resonant current $i_{Lr}$ and the exciting current $i_{Lm}$ flows in the primary winding np of the transformer T, and a voltage is induced in the secondary winding ns of the transformer T due to magnetic field coupling. In addition, on the secondary side of the transformer T, the current $i_{D22}$ flows through a path including the second secondary winding ns2 and the diode D22.

In the present preferred embodiment, the switching frequency fs is set to correspond to the first resonant frequency f1. In this case, the input-output voltage ratio (gain) of the resonant converter circuit 20 when the turn ratio of the transformer T is not taken into consideration becomes about "1", and a voltage applied to the primary side of the transformer T occurs on the secondary side. In other words, as illustrated in FIG. 2, the resonant current $i_{Lr}$ has a substantially sine wave shape, and a current $i_{D21}+i_{D22}$ on the secondary side of the transformer T also has a substantially sine wave shape.

Figure 3:
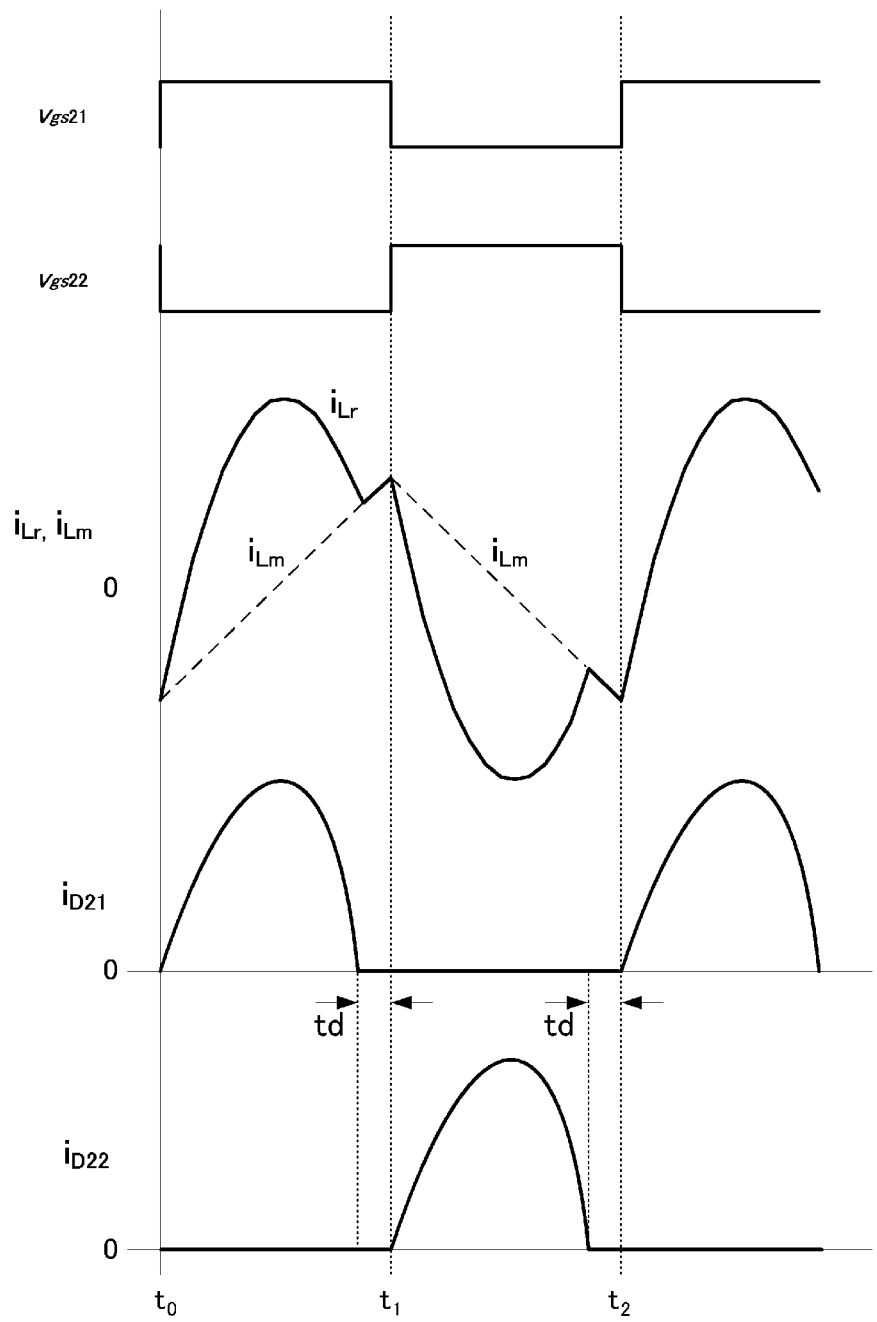
FIG. 3 is a waveform diagram when a switching frequency is lower than a first resonant frequency.
Figure 4:
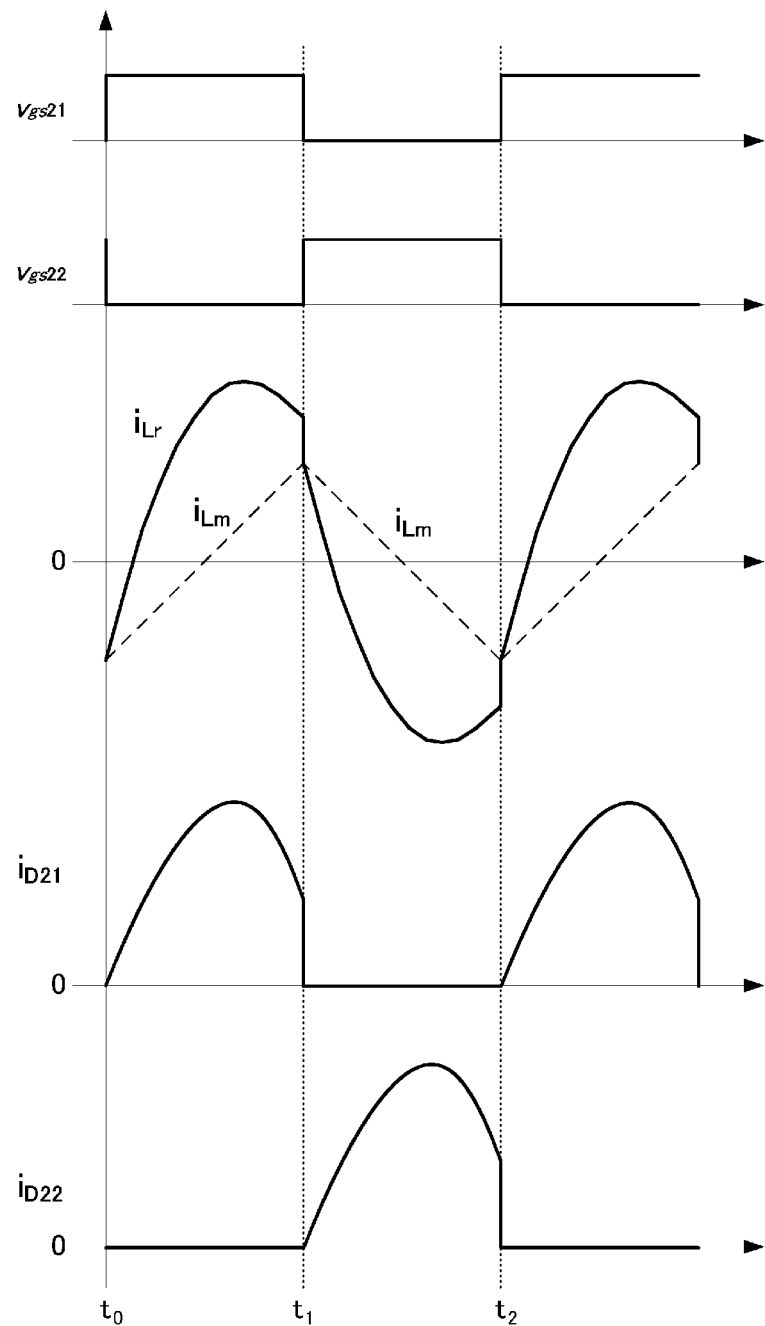
FIG. 4 is a waveform diagram when the switching frequency is higher than the first resonant frequency.

Hereinafter, for comparison, a waveform when the switching frequency fs is lower than the first resonant frequency fr is illustrated in FIG. 3, and a waveform when the switching frequency fs is higher than the first resonant frequency fr is illustrated in FIG. 4.

When, for example, in the case of an instantaneous power failure, the input voltage Vi becomes low on the assumption that there is no boost converter circuit 10, fs<f1 is set so that the gain of the resonant converter circuit 20 becomes about "1" or greater. In this case, due to the influence of the exciting current $i_{Lm}$, as illustrated in FIG. 3, a non-conduction time period td occurs in an output current on the secondary side. A current effective value during a conduction time period increases with an increase in the length of the non-conduction time period td, and a loss increases.

In addition, when the input voltage Vi is high, fs>f1 is set so that the gain of the resonant converter circuit 20 becomes about "1" or less. In this case, the diodes D21 and D22 on the secondary side are turned off in states in which currents flow therethrough. In other words, the diodes D21 and D22 on the secondary side are put into hard switching, which results in an increase in an element stress due to surge and/or an increase in a switching loss.

From the above, when the switching frequency fs is set to correspond to the first resonant circuit f1, and the FETs 21 and 22 are subjected to switching control, the most efficient operation is achieved. In addition, when the input voltage Vi fluctuates, it is possible to stabilize the bus voltage Vbus provided by the boost converter circuit 10. Therefore, it is possible to continuously set fs=f1. In this manner, in the present preferred embodiment, it is possible to efficiently operate the switching power-supply device 101 while fluctuations of the input voltage are taken into consideration.

Second Preferred Embodiment

Figure 5:
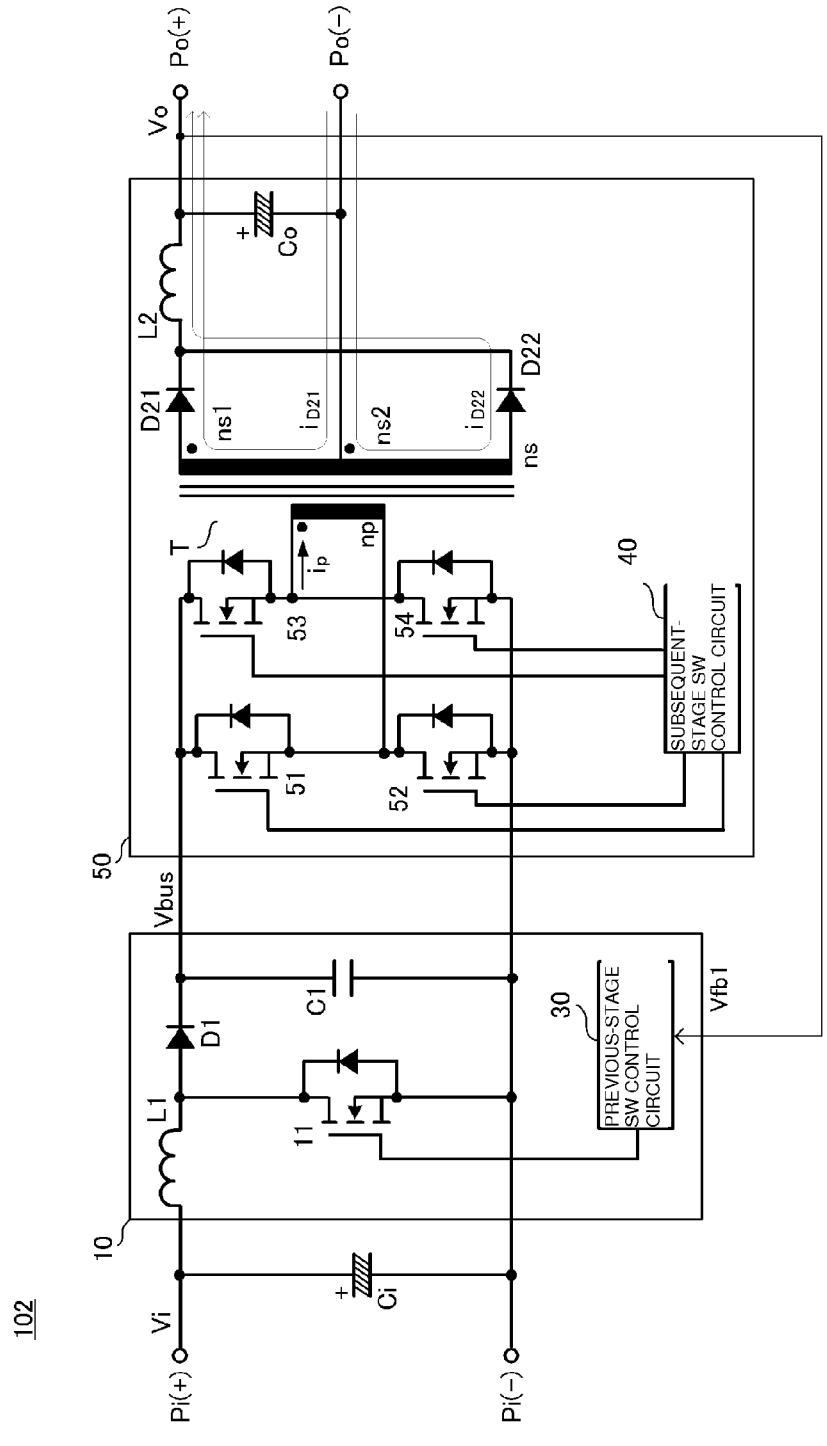
FIG. 5 is a circuit diagram of a switching power-supply device according to a second preferred embodiment of the present invention.

FIG. 5 is the circuit diagram of a switching power-supply device according to a second preferred embodiment of the present invention. The second preferred embodiment is different from the first preferred embodiment in an insulated bridge converter located at a subsequent stage. A switching power-supply device 102 according to the present preferred embodiment preferably includes a full-bridge converter circuit 50 in the subsequent stage.

The full-bridge converter circuit 50 includes a transformer T and FETs 51, 52, 53, and 54 on the primary side of the transformer T. The FETs 51, 52, 53, and 54 are arranged in a bridge configuration, and a primary winding np is connected to a connection point between the FETs 51 and 52 and a connection point between the FETs 53 and 54. In detail, the FET 51, the primary winding np, and the FET 54 define a series resonant circuit that is connected to the input portion of the full-bridge converter circuit 50. In addition, the FET 53, the primary winding np, and the FET 52 define a series resonant circuit that is connected to the input portion of the full-bridge converter circuit 50.

On the secondary side of the transformer T, the full-bridge converter circuit 50 includes diodes D21 and D22, a choke coil L2, and a smoothing capacitor Co. The diodes D21 and D22, the choke coil L2, and the smoothing capacitor Co define a rectifier circuit in preferred embodiments of the present invention. The first end of the secondary winding ns of the transformer T is connected to the anode terminal of the diode D21, and the second end thereof is connected to the anode terminal of the diode D22. The cathode terminal of each of the diodes D21 and D22 is connected to the output terminal Po(+) through the choke coil L2. The smoothing capacitor Co is connected to the output terminals Po(+) and Po(−).

The full-bridge converter circuit 50 includes a subsequent-stage SW control circuit 40. In the same or substantially the same manner as in the first preferred embodiment, by adjusting the on-duty ratio of the FET 11 in the boost converter circuit 10, the output voltage Vo is controlled, and the subsequent-stage SW control circuit 40 subjects the FETs 51, 52, 53, and 54 to switching control with a fixed on-duty ratio of about 50% and with the fixed switching frequency fs.

Hereinafter, current waveforms generated by the switching power-supply device 102 will be described when the on-duty ratio is about 50% and when the on-duty ratio is less than about 50%. The following will be described based on the condition that the output voltage Vo having the same or substantially the same value as the input voltage Vi is output with respect to the input voltage Vi.

Figure 6A:
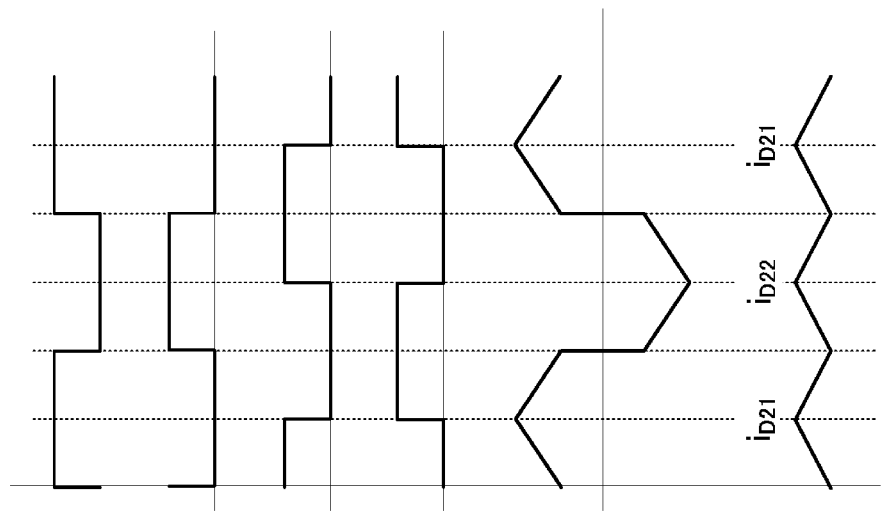
FIG. 6A is a diagram illustrating a current waveform when an operation is performed with an on-duty ratio close to about 50%.
Figure 6B:
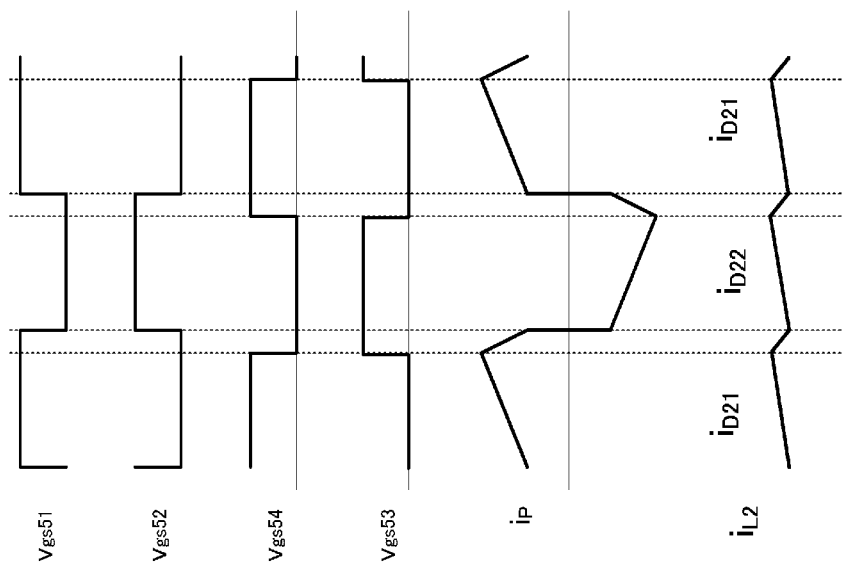
FIG. 6B is a diagram illustrating a current waveform when an operation is performed with an on-duty ratio smaller than FIG. 6A.

FIG. 6A is a diagram illustrating a current waveform when an operation is performed with an on-duty ratio of about 50%, and FIG. 6B is a diagram illustrating a current waveform when an operation is performed with an on-duty ratio less than about 50%. In the case of FIG. 6A, the FETs 51 and 52 and the FETs 53 and 54 are individually subjected to switching control with an on-duty ratio of about 50%, and time periods when the FETs 51 and 54 or the FETs 52 and 53 are turned on are set so as to be about 50% with a dead time sandwiched therebetween. In the case of FIG. 6B, the FETs 51 and 52 and the FETs 53 and 54 are individually subjected to switching control with an on-duty ratio of about 50%, and time periods when the FETs 51 and 54 and the FETs 52 and 53 are turned on are shifted.

In FIGS. 6A and 6B, a current ip is a current flowing in the primary winding np, and voltages Vgs51, Vgs52, Vgs53, and Vgs54 are the gate-source voltages of the FETs 51, 52, 53, and 54.

The on-duty ratio in the full-bridge converter becomes a ratio of a voltage to the output voltage Vo wherein, with the FETs 51 and 54 or the FETs 52 and 53 being turned on, the former voltage is applied to a filter defined by the choke coil L2 and the smoothing capacitor Co. In other words, when the on-time of the FET is shorter, a higher voltage is applied to the secondary winding ns of the transformer T.

If there is no boost converter circuit 10, it may be necessary to consider an instantaneous power failure in which the input voltage Vi is less than a rated operation. In other words, even if the input voltage Vi is reduced, it may be necessary to obtain a desired output by lengthening the on-time of the FET. When such a design is adopted, the on-duty ratio is reduced as illustrated in FIG. 6B. At this time, a high voltage is applied to the secondary side. Therefore, it may be necessary for high-voltage elements to be used as the diodes D21 and D22.

However, in the present preferred embodiment, the boost converter circuit 10 is provided in the previous stage, and an input voltage (bus voltage Vbus) to the full-bridge converter circuit 50 is adjusted. Accordingly, it is possible to fix the on-duty ratio at a high level as illustrated in FIG. 6A, regardless of the input voltage Vi, and high voltages are not applied to the diodes D21 and D22 on the secondary side.

In addition, as illustrated in FIGS. 6A and 6B, by increasing the on-duty ratio, it is possible to reduce a ripple current on the secondary side.

In other words, in a case in which the bus voltage Vbus fluctuates, when the bus voltage Vbus is high, a current ripple on the secondary side is increased. Therefore, it is preferable that the bus voltage Vbus is a given level, and by providing the boost converter circuit 10 in the previous stage, it is possible to achieve this.

In addition, in the full-bridge converter, during an off-period when the FETs 51 and 53 or the FETs 52 and 54 are turned on and no voltage is applied to the primary winding np of the transformer T, a current, whose path includes turned-on FETs and the primary winding np, continues flowing, due to the function of the leakage inductance of the transformer T. This circulating current does not contribute to the power supply to a load, and an unnecessary loss occurs, accordingly. By increasing the on-duty ratio, the off-period is reduced, and it is possible to significantly reduce or prevent a time period in which the circulating current flows, and to reduce a loss accordingly.

As described above, even if the on-duty ratio and the switching frequency of the FETs 51, 52, 53, and 54 are fixed, it is possible for the switching power-supply device 102 to operate efficiently while the instantaneous power failure is taken into consideration.

Third Preferred Embodiment

Figure 7:
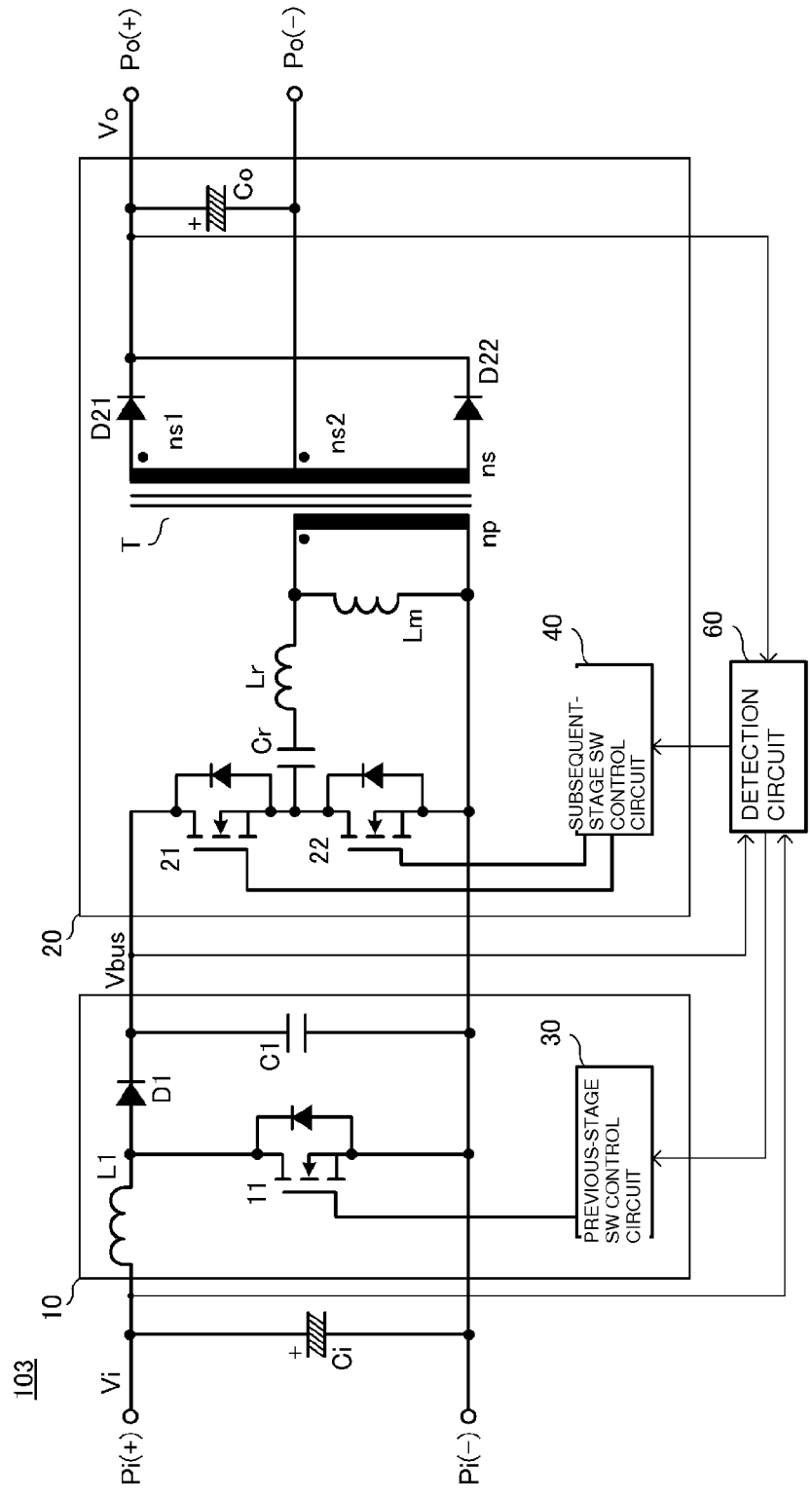
FIG. 7 is a circuit diagram of a switching power-supply device according to a third preferred embodiment of the present invention.

FIG. 7 is the circuit diagram of a switching power-supply device according to a third preferred embodiment of the present invention. A switching power-supply device 103 according to the third preferred embodiment includes a detection circuit 60 arranged to detect the input voltage Vi, the bus voltage Vbus of the boost converter circuit 10, and the output voltage Vo. The detection circuit 60 outputs the detected input voltage Vi, bus voltage Vbus, and output voltage Vo to the previous-stage SW control circuit 30 and the subsequent-stage SW control circuit 40.

When the input voltage Vi is less than a first threshold value, the previous-stage SW control circuit 30 controls the on-duty ratio of the FET 11 in response to the output voltage Vo, and subjects the FET 11 to switching control. Using a preliminarily set fixed switching frequency having a good efficiency, the subsequent-stage SW control circuit 40 subjects the FETs 21 and 22 to switching control with the duty ratio of about 50% and a dead time sandwiched therebetween. Hereinafter, this operation is referred to as a first mode.

When the input voltage Vi is at least the first threshold value and less than a second threshold value, the previous-stage SW control circuit 30 stops the switching control of the FET 11. By adjusting the switching frequency, the subsequent-stage SW control circuit 40 subjects the FETs 21 and 22 to switching control. Hereinafter, this operation is referred to as a second mode.

When the input voltage Vi is at least the second threshold value, the previous-stage SW control circuit 30 and the subsequent-stage SW control circuit 40 stop the switching control of the FET 11 and FETs 21 and 22. Hereinafter, this operation is referred to as a third mode.

The above-described individual modes will be described with numerical values specifically cited. When it is assumed that, at the time of a rated operation, preferably the input voltage Vi is about 340 V and an operation input voltage is about 200 V to about 420 V, for example, the bus voltage Vbus at the time of the rated operation is preferably set so as to be about 380 V, for example.

First Mode

When the input voltage Vi is about 380 V or less, the switching power-supply device 103 performs the rated operation. At this time, the bus voltage Vbus is about 380 V.

Second Mode

When the input voltage Vi is between about 380 V and about 420 V, the switching control of the FET 11 is stopped, and the bus voltage Vbus is approximately equal to the input voltage Vi. In addition, the switching frequency of each of the FETs 21 and 22 in the resonant converter circuit 20 is controlled, and thus, the output voltage Vo is controlled. Specifically, when a load current is increased, the switching frequency is reduced. When the load current is decreased, the switching frequency is increased.

Third Mode

When the input voltage Vi is about 420 V or greater, it is determined that a malfunction has occurred, and the operation is stopped.

As described above, in the present preferred embodiment, when the input voltage Vi becomes high with a threshold value as a reference, the switching control of the FET 11 is stopped, and thus, it is possible to improve the efficiency of the boost converter circuit 10 during the rated operation.

For example, when the boost converter circuit 10 is designed so as to be able to deal with fluctuations of the input voltage only with the above-described first mode, it is difficult for the boost converter circuit to output a voltage less than the input voltage. Therefore, the boost converter circuit 10 is designed with the highest input voltage as a reference. When a difference between the highest input voltage in design and an input voltage during a rated operation is large, the efficiency during the rated operation is reduced. However, in preferred embodiments of the present invention, when the input voltage Vi is greater than the threshold value, even if the switching control of the FET 11 in the boost converter circuit is stopped, the output voltage Vo may be controlled by the switching of the FETs 21 and 22. Therefore, if a difference between the threshold value and an input voltage during the rated operation is set to a relatively small level, it is possible to improve the efficiency of the boost converter circuit 10 during the rated operation. Accordingly, for the switching power-supply device 103, it is possible to provide a power-supply device whose efficiency during a rated operation is high even if the fluctuation range of the input voltage Vi is large.

Fourth Preferred Embodiment

Figure 8:
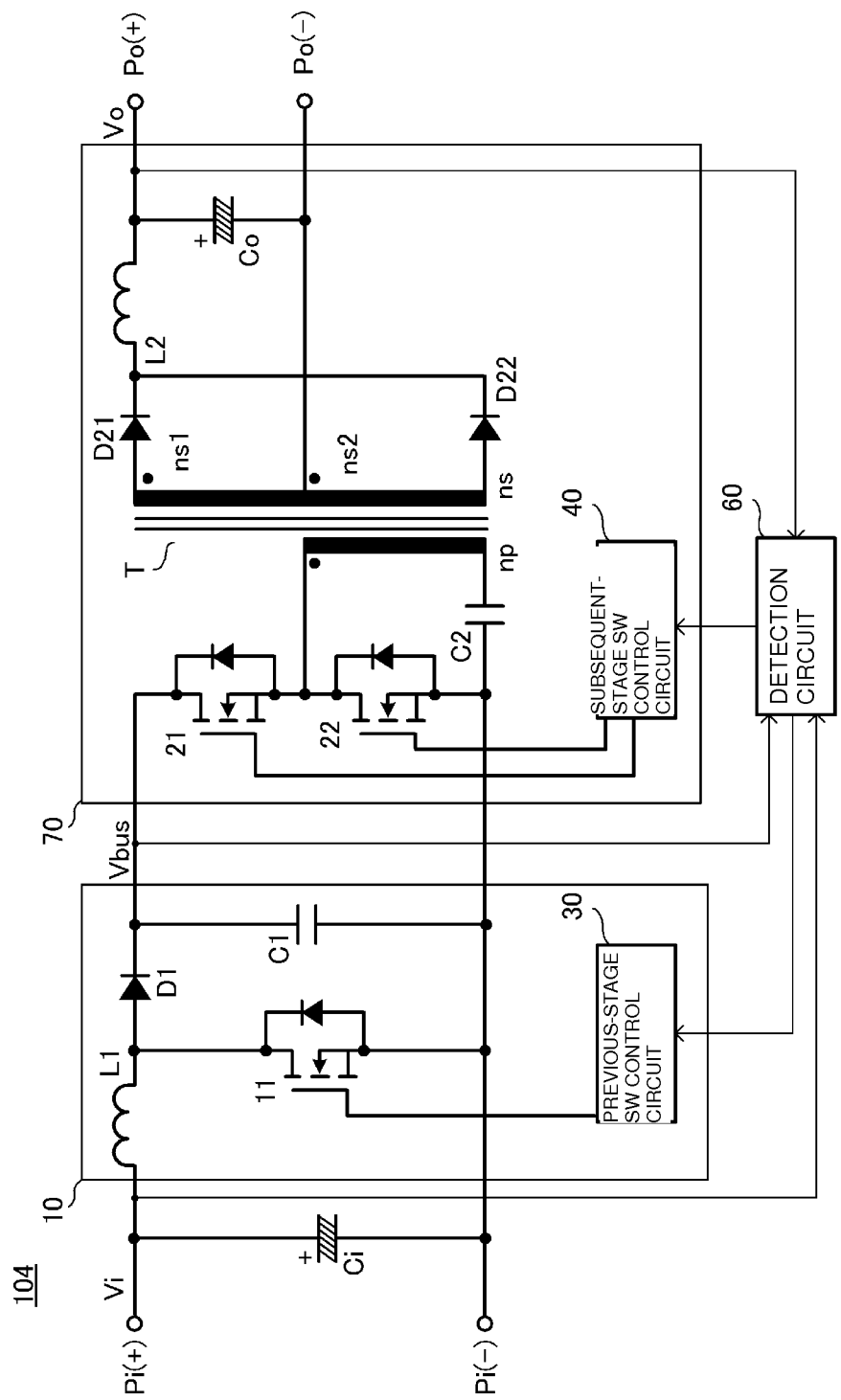
FIG. 8 is a circuit diagram of a switching power-supply device according to a fourth preferred embodiment of the present invention.

FIG. 8 is the circuit diagram of a switching power-supply device according to a fourth preferred embodiment of the present invention. A switching power-supply device 104 according to the fourth preferred embodiment includes a boost converter circuit 10, a half-bridge converter circuit 70, and a detection circuit 60. The half-bridge converter circuit 70 includes a transformer T, and includes FETs 21 and 22 and a capacitor C2 on a primary side.

In detail, the drain terminal of the FET 21 is connected to the output portion of the boost converter circuit 10, and the source terminal thereof is connected to the first end of the primary winding np of the transformer T. The second end of the primary winding np is connected to the capacitor C2, and a series resonant circuit is defined by the FET 21, the primary winding np, and the capacitor C2.

The drain terminal of the FET 22 is connected to the first end of the primary winding np, and the source terminal thereof is connected to the second end of the primary winding np through the capacitor C2. The FET 22, capacitor C2, and primary winding np define a closed-loop circuit.

The gate terminal of each of the FETs 21 and 22 is connected to a subsequent-stage SW control circuit 40, and the FETs 21 and 22 are subjected to on/off control by the subsequent-stage SW control circuit 40. In detail, the FETs 21 and 22 are alternately turned on with the duty ratio of about 50% and a dead time sandwiched therebetween.

The previous-stage SW control circuit 30 and the subsequent-stage SW control circuit 40 may also be configured such that the FET 11 is subjected to switching control on the basis of the output voltage Vo and the FETs 21 and 22 are subjected to switching control with a fixed on-duty ratio and a fixed switching frequency as described with reference to the first preferred embodiment, and may also be configured such that the FETs 11, 21, and 22 are subjected to switching control in response to the input voltage Vi fluctuating with respect to a threshold value, described with reference to the third preferred embodiment.

In addition, the design of the specific configuration of the switching power-supply device may be arbitrarily changed, and the most suitable functions and effects of preferred embodiments of the present invention have been described. In addition, functions and effects of preferred embodiments of the present invention are not limited to the functions and effects described above with respect to the first to fourth preferred embodiments.

For example, the on-duty ratio and the switching frequency of the FET subjected to switching control by the subsequent-stage SW control circuit 40 may be arbitrarily set to optimum values, and are not limited to any specific values. In addition, even if the switching frequency is changed to an optimum frequency in response to a load or subjected to frequency diffusion in order to reduce EMI, the functions and effects of preferred embodiments of the present invention may be obtained. While each of the switching power-supply devices according to the third and fourth preferred embodiments preferably includes the independent detection circuit 60, the previous-stage SW control circuit 30 or the subsequent-stage SW control circuit 40 may also have a function to detect individual voltages. In the third preferred embodiment, a mode preferably is switched based on the threshold values. However, so as to smoothly switch an operation between the first mode and the second mode, a mode may also be provided in which the switching control of the FET 11 and the switching control of the FETs 21 and 22 are simultaneously performed. In addition, so as to prevent an operation from becoming unstable due to the uncertainty of a mode when the input voltage Vi is substantially equal to the threshold value, two threshold values M1 and M2 (M1<M2) may be provided, and a mode may also be switched with a hysteresis provided such that a first mode is selected when the input voltage Vi is less than the threshold value M1 and a second mode is selected when the input voltage Vi is greater than the threshold value M2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power-supply device comprising:
a non-insulated converter arranged to boost an input power supply voltage, which is input to the non-insulated converter, and output a direct-current voltage; and
an insulated bridge converter into which the direct-current voltage output from the non-insulated converter is input and that is arranged to output a direct-current voltage to a load; wherein
the insulated bridge converter includes:
 a transformer including a primary winding and a secondary winding;
 an alternating-current voltage generation circuit arranged to be connected to the primary winding, to include a first switch element and a second switch element, and to generate and apply to the primary winding an alternating-current voltage from the input direct-current voltage by switching the first switch element and the second switch element; and
 a rectifier circuit arranged to be connected to the secondary winding and to rectify and output to the load a voltage induced in the secondary winding by magnetic field coupling with the primary winding;
the non-insulated converter includes:
 an inductor;
 a capacitor; and
 a third switch element arranged to switch energization of the inductor; and
the switching power-supply device further includes:
 a switching control circuit arranged to alternately subject the first switch element and the second switch element to on/off control with a dead time sandwiched therebetween, using a fixed on-duty ratio and a fixed switching frequency; and
 a PWM control circuit arranged to subject the third switch element to on/off control, to control an on-duty ratio of the third switch element, and to adjust an output voltage to the insulated bridge converter;
when the input power supply voltage is less than a threshold value, which is greater than a voltage at a time of a rated operation and less than a maximum value of an operation input voltage, the PWM control circuit and the switching control circuit performs the rated operation;
when the input power supply voltage is equal to the threshold value or greater, the PWM control circuit stops switching control of the third switch element; and
the switching control circuit controls at least one of an on-duty ration and a switching frequency of the first switch element and the second switch element.

2. The switching power-supply device according to claim 1, wherein the insulated bridge converter is a resonant converter.

3. The switching power-supply device according to claim 2, wherein
the alternating-current voltage generation circuit includes a series resonant circuit including a resonance capacitor and a resonance inductor, and an exciting inductance parallel to the primary winding; and
the switching control circuit subjects the first switch element and the second switch element to on/off control with a switching frequency that corresponds to a resonant frequency of the series resonant circuit.

4. The switching power-supply device according to claim 1, wherein the switching control circuit sets the fixed on-duty ratio to about 50% and subjects the first switch element and the second switch element to on/off control.

5. The switching power-supply device according to claim 1, wherein the insulated bridge converter is a full-bridge converter.

6. The switching power-supply device according to claim 1, wherein the insulated bridge converter is a half-bridge converter.

7. The switching power-supply device according to claim 1, wherein the first and second switch elements are FETs.

8. The switching power-supply device according to claim 1, wherein the third switch element is a FET.

9. The switching power-supply device according to claim 1, wherein the non-insulated converter further includes a diode connected in series to the inductor.

10. The switching power-supply device according to claim 9, wherein the third switch element is a FET including a drain terminal connected to a connection point between the inductor and the diode.

11. The switching power-supply device according to claim 1, wherein the PWM control circuit includes an oscillator, a comparator, and a driver.

12. The switching power-supply device according to claim 1, wherein each of the first and second switch elements in an n-type FET.

13. The switching power-supply device according to claim 3, wherein the resonance inductor is defined by leakage inductance of the transformer.

14. The switching power-supply device according to claim 3, wherein the resonance inductor is defined by an external component.

15. The switching power-supply device according to claim 3, wherein
the series resonant circuit has a first resonant frequency and a second resonant frequency;
the first resonant frequency is a frequency that is determined by the resonance inductor and the resonance capacitor; and
the second resonant frequency is a frequency that is determined by the resonance inductor, the resonance capacitor, and the exciting inductance.

16. The switching power-supply device according to claim 1, wherein the rectifier circuit of the insulated bridge converter includes first and second diodes and a smoothing capacitor provided on a secondary side of the transformer at which the secondary winding is provided.

17. The switching power-supply device according to claim 16, wherein a first end of the secondary winding of the transformer is connected to an anode terminal of the first diode, and a second end of the secondary winding is connected to an anode terminal of the second diode, and a cathode terminal of each of the first and diodes is connected to an output terminal of the switching power-supply device.

18. The switching power-supply device according to claim 16, wherein the smoothing capacitor is connected to each of a pair output terminals of the switching power-supply device.

19. The switching power-supply device according to claim 1, wherein the secondary winding includes an intermediate tap connected to an output terminal of the switching power-supply device.

\* \* \* \* \*